United States Patent [19]
Breitweg et al.

[11] 4,400,991
[45] Aug. 30, 1983

[54] RACK AND PINION STEERING GEAR, ESPECIALLY FOR MOTOR VEHICLES

[75] Inventors: Werner Breitweg; Wolfgang Walter, both of Schwabisch Gmund, Fed. Rep. of Germany

[73] Assignee: Zahnradfabrik Friedrichshafen, AG., Friedrichshafen, Fed. Rep. of Germany

[21] Appl. No.: 169,085

[22] Filed: Jul. 15, 1980

[30] Foreign Application Priority Data

Jul. 17, 1979 [DE] Fed. Rep. of Germany ....... 2928732

[51] Int. Cl.³ .............................................. B62D 3/12
[52] U.S. Cl. ......................................... 74/498; 74/422
[58] Field of Search .................................. 74/422, 498

[56] References Cited

U.S. PATENT DOCUMENTS 4,095,482  6/1978  Kirschner ............................ 74/422

FOREIGN PATENT DOCUMENTS 7137869  4/1971  Fed. Rep. of Germany .
2037931  10/1979  United Kingdom .

Primary Examiner—Kenneth Dorner
Attorney, Agent, or Firm—Zalkind & Shuster

[57] ABSTRACT

A thrust piece having a cylindrical, thin-walled portion is associated with the rack biasing device of a rack and pinion steering gear. The thin-walled portion is slotted and urged into contact with the gear housing by a spreader element to dampen movement of the biasing device which is slidably supported in the housing.

2 Claims, 5 Drawing Figures

RACK AND PINION STEERING GEAR, ESPECIALLY FOR MOTOR VEHICLES

BACKGROUND OF THE INVENTION

A rack steering gear is known, for example, from German Offenlegungsschrift No. 2,001,478. The cylindrical plastic thrust piece contained in such steering mechanism is made hollow and is mounted in the rack housing with a relatively thick-walled guide part. The guide part is supported on its side remote from the rack against a sheet-metal ring deformed during assembly. Due to the bracing of the thrust piece between the sheet-metal ring and the rack, an elasticity is provided which is sufficient, in the new state, to press the rack against the drive pinion. However, after a certain operating time the thrust-piece bedding for the rack can wear away, so that play arises between the bedding and the rack. A sufficient dampening of rack vibration then seems to be no longer guaranteed. Since plastics are inclined to swell under the influence of temperature and atmospheric moisture, that is to say they increase their volume, too large a radial compression in the housing bore can arise on the guide part of the thrust piece. This leads to the occurrence of jamming. If, on the contrary, the play is chosen too large, the thrust piece can rattle due to radial movements.

It is also known from German Utility Model G 71 37 869.3 to insert an elastic ring into an annular groove on the outer periphery of the thrust piece in order to dampen the lifting movements of the thrust piece. However, here, the thrust piece itself is made entirely of rigid metal.

SUMMARY OF THE INVENTION the object of the invention is to improve the plastic thrust piece of a rack steering gear so that it retains its good dampened properties with small wear over a long service life. As constant a pressure per unit of area as possible of the guide part in the housing bore is to be provided. Moreover, the thrust piece is to be manufactured at moderate cost and is to be simple to assemble.

The thrust piece, according to the invention, has an axially slotted guide part with small wall thickness, which is pressed by a spreader element against the wall of the steering-gear housing. By means of this measure, the lifting movement of the thrust piece is strongly dampened in both directions.

Moreover, to increase the stability of the thrust piece, it is provided with an upright to absorb the radial forces exerted by the rack.

BRIEF DESCRIPTION OF DRAWING FIGURES

Further details of the invention are explained hereinafter with reference to exemplary embodiments illustrated in the drawing.

DETAILED DESCRIPTION OF PREFERRED EMBODIMENTS

Figure 1:
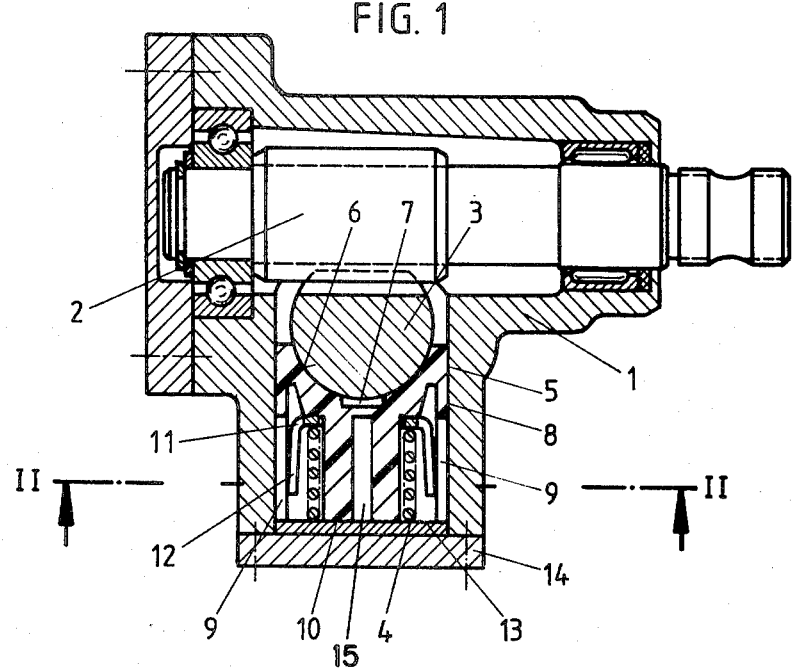
FIG. 1 is a section view through a rack steering gear with which the present invention is associated.
Figure 2:
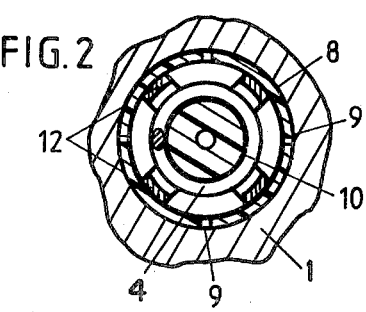
FIG. 2 is a section view taken substantially through a plane indicated by section line II—II in FIG. 1.

In FIGS. 1 and 2 a drive pinion 2 mounted turnably in a housing 1 engages with a rack 3. A thrust piece 5, of elastic material, which is loaded by a compression spring 4 presses the rack 3 against the toothing of the drive pinion. Thus, the spring 4 exerts an axial bias on thrust piece 5 in a direction along its longitudinal axis as shown.

Figure 3:
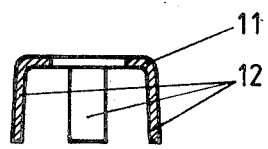
FIG. 3 is a section through the spreader element according to FIG. 1.

A bed 6 with a lubricant groove 7 is formed for the rack 3 in the thrust piece 5. According to the invention, a cylindrical guide portion 8 of the thrust piece is made relatively thin-walled and is provided with, for example, four axially running slots 9 to render it elastically flexible. The slots 9 extend in their length approximately to below the bed 6. An inner upright 10 body portions of the thrust piece integral with the bed 6 as shown serves to absorb the radial forces of the rack 3 and has a cavity 15 formed therein. Inserted within the thrust piece 5 is a spreader element 11 which is designed as a leg spring and which endeavours to spread out the slotted guide part 8. FIGS. 2 and 3 show that the spreader element 11 has, for example, four legs 12 lying resiliently in engaged with the guide part 8. The recesses serve as a lock against turning for the leg spring. The spring 4 which loads the thrust piece 5 in the direction of the rack 3 is supported in the thrust piece via an approximately rectangularly flanged annular part of the spreader element 11. A more favourable pressure per unit of area is thereby obtained on the thrust piece 5 and a special annular disc can be saved. The upright body portion 10 serves simultaneously as a spring guide. The thrust piece 5 and the spring 4 are supported via a shim 13 on a housing cover 14.

The novel shaping of the thrust piece 5 together with the inner spreader element 11 designed as a leg spring guarantee the steering gear very good supporting and dampening properties as well as small wear. Moreover, a small overall volume and a simple assembly of the spreader element are achieved, since this spreader element merely has to be introduced into the cavity between the guide part 8 and upright 10.

Figure 4:
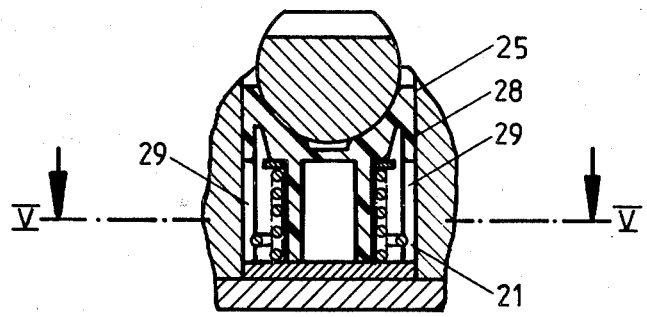
FIG. 4 is a partial section through a further elemplary embodiment.
Figure 5:
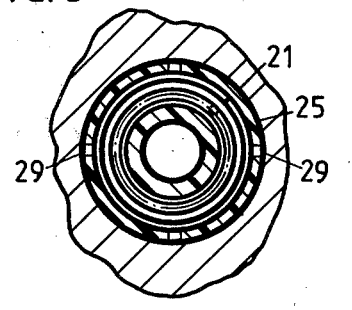
FIG. 5 is a section along the line V-V of FIG. 4.

The exemplary embodiment, according to FIG. 4, shows a thrust piece 25 whose thin-walled guide part 28 is provided likewise with slots 29. Here, a spring washer is used as spreader element 21.

What is claimed is:

1. In a rack steering gear having a steering-gear housing (1), a drive pinion (2), a spindle connected to the drive pinion, an axially displaceable rack (3) engaged with the drive pinion and arranged transversely to the spindle, and plastic thrust means (5, 25) mounted resiliently in the steering-gear housing for supporting and guiding said rack, and a spring (4) biasing the thrust means, the improvement including a cylindrical, thin-walled quide portion (8, 28) on the thrust means provided with axially running slots; a spreader element (11, 21) acting on the thin-walled quide portion disposed within the thrust means; the thrust means further including an upright portion (10) supported in the housing and a rack supporting bed (6) integral with the upright portion, the upright portion being a hollow cylinder arranged within the spring (4).

2. In a steering apparatus having a housing (1), a rack (3) displaceable along a longitudinal axis and engaged with a rotatable pinion (2) in said housing, an axial compression spring (4) in said housing and a thrust member (5) through which the spring urges said rack into engagement with said pinion to take up gear play, the improvement residing in said thrust member having an inner axial thrust absorbing body portion (10) on which the compression spring is seated and an outer elastically flexible portion (8), and prestressed spring means (11-12, 21) mounted within the thrust member for radially biasing said outer flexible portion thereof into sliding frictional contact with the housing to dampen movements imparted to the thrust member because of gear play between the rack and pinion.

* * * * *